(12) United States Patent
Burke

(10) Patent No.: US 6,908,351 B2
(45) Date of Patent: Jun. 21, 2005

(54) EXPANDED POLYSTYRENE CORE SPORTS BOARD

(75) Inventor: Scott Burke, Oceanside, CA (US)

(73) Assignee: Wham-O, Inc., Emeryville, CA (US)

( * ) Notice: Subject to any disclaimer, the term of this patent is extended or adjusted under 35 U.S.C. 154(b) by 0 days.

(21) Appl. No.: 10/603,225

(22) Filed: Jun. 24, 2003

(65) Prior Publication Data

US 2004/0266289 A1 Dec. 30, 2004

(51) Int. Cl.[7] .............................................. B63B 35/79
(52) U.S. Cl. ........................ 441/65; 114/39.14; 441/74
(58) Field of Search ........................... 114/39.14, 357; 441/65, 68, 74

(56) References Cited

U.S. PATENT DOCUMENTS

| | | |
|---|---|---|
| 632,738 A | 9/1899 | O'Hara |
| 670,995 A | 4/1901 | Moore |
| 1,352,998 A | 9/1920 | Thompson |
| D183,016 S | 6/1958 | O'Herron |
| 2,875,720 A | 3/1959 | Hupp |
| 3,070,817 A | 1/1963 | Kohrn et al. |
| 3,207,646 A | 9/1965 | Hacklander |
| 3,269,882 A | 8/1966 | Willy |
| 3,276,050 A | 10/1966 | Edwards |
| 3,325,332 A | 6/1967 | Cleereman |
| 3,326,564 A | 6/1967 | Heuvel |
| 3,378,274 A | 4/1968 | Poppen |
| 3,414,919 A | 12/1968 | Gust |
| 3,502,540 A | 3/1970 | Pietrocola |
| 3,514,798 A | 6/1970 | Ellis |
| 3,543,315 A | 12/1970 | Hoffman |
| 3,732,839 A | 5/1973 | Schuster et al. |
| 3,755,063 A | 8/1973 | Massey et al. |
| 3,776,563 A | 12/1973 | Tigert |
| 3,812,225 A | 5/1974 | Hosoda et al. |
| 3,814,417 A | 6/1974 | Catlin |
| 3,823,047 A | 7/1974 | Colombo |
| 3,829,343 A | 8/1974 | Remmert |
| 3,857,915 A | 12/1974 | Crowley |
| 3,918,114 A | 11/1975 | Schmitt |
| 3,930,917 A | 1/1976 | Esakov et al. |
| 3,937,482 A | 2/1976 | Johnson |
| 4,071,264 A | 1/1978 | Legrand et al. |
| 4,091,154 A | 5/1978 | Hirai |
| 4,092,198 A | 5/1978 | Scher et al. |
| 4,118,050 A | 10/1978 | Schnurrenberger |
| 4,129,911 A | 12/1978 | McDonald et al. |
| 4,209,867 A | 7/1980 | Abrams, III |
| D258,516 S | 3/1981 | Slingerland |
| 4,273,816 A | 6/1981 | Tollette |
| 4,297,796 A | 11/1981 | Stirtz et al. |
| 4,399,086 A | 8/1983 | Walter |
| 4,406,628 A | 9/1983 | Rademacher |

(Continued)

FOREIGN PATENT DOCUMENTS

| | | |
|---|---|---|
| DE | 3019535 | 11/1981 |
| DE | 3146381 | 6/1983 |
| DE | 3124768 | 8/1983 |
| DE | 3206334 | 9/1983 |
| DE | 3406689 | 8/1985 |
| DE | 3625413 | 2/1988 |
| DE | 3839805 | 5/1990 |
| GB | 357637 | 9/1931 |
| WO | WO80/01673 | 8/1980 |
| WO | WO83/00127 | 1/1983 |

*Primary Examiner*—Sherman Basinger
(74) *Attorney, Agent, or Firm*—Kolisch Hartwell, P.C.

(57) ABSTRACT

A sports board that includes an expanded-polystyrene sports board core. A composite top skin is heat bonded to the top surface of the expanded polystyrene sports board core. Composite side rail skins are heat bonded to side rails of the expanded polystyrene sports board core. A composite slick bottom skin is heat bonded to a bottom surface of the expanded polystyrene sports board core.

16 Claims, 5 Drawing Sheets

U.S. PATENT DOCUMENTS

| | | |
|---|---|---|
| 4,457,729 A | 7/1984 | Peerlkamp |
| 4,533,150 A | 8/1985 | Hardy |
| 4,539,057 A | 9/1985 | Ahlm |
| 4,561,664 A | 12/1985 | Cashmere |
| 4,562,784 A | 1/1986 | Lineback |
| 4,571,195 A | 2/1986 | Brooks, Jr. |
| 4,603,650 A | 8/1986 | Bjorn |
| 4,621,002 A | 11/1986 | Kuhlmann et al. |
| 4,666,171 A | 5/1987 | Sellers |
| 4,706,910 A | 11/1987 | Walsh et al. |
| 4,713,032 A | 12/1987 | Frank |
| 4,740,258 A | 4/1988 | Breitscheidel |
| 4,752,260 A | 6/1988 | Stewart |
| 4,753,836 A | 6/1988 | Mizell |
| 4,797,312 A | 1/1989 | Sherwood |
| 4,806,412 A | 2/1989 | Wank et al. |
| 4,848,786 A | 7/1989 | Mankau |
| 4,850,913 A | 7/1989 | Szabad, Jr. |
| 4,857,380 A | 8/1989 | Kent |
| 4,878,980 A | 11/1989 | Stedman |
| 4,892,054 A | 1/1990 | Davidson |
| 4,894,034 A | 1/1990 | Brown, III |
| 5,052,963 A | 10/1991 | Johnson, III |
| 5,114,370 A | 5/1992 | Moran |
| 5,116,269 A | 5/1992 | Moran |
| 5,181,745 A | 1/1993 | Jacobsen et al. |
| 5,211,593 A | 5/1993 | Schneider et al. |
| 5,224,890 A | 7/1993 | Moran |
| 5,234,638 A | 8/1993 | Jang |
| 5,238,434 A | 8/1993 | Moran |
| 5,275,860 A | 1/1994 | D'Luzansky et al. |
| 5,295,883 A | 3/1994 | Moran |
| 5,350,544 A | 9/1994 | Bambara et al. |
| 5,460,871 A | 10/1995 | Andersen |
| 5,480,721 A | 1/1996 | Pozzoli et al. |
| 5,489,228 A | 2/1996 | Richardson et al. |
| 5,503,921 A | 4/1996 | Chang et al. |
| 5,647,784 A | 7/1997 | Moran |
| 5,658,179 A | 8/1997 | Glydon et al. |
| 5,797,779 A | 8/1998 | Stewart |
| 5,882,776 A | 3/1999 | Bambara et al. |
| 5,928,045 A | 7/1999 | Szabad |
| 5,934,961 A | 8/1999 | Mehrmann et al. |
| 5,944,570 A | 8/1999 | Appleby |
| 6,054,005 A | 4/2000 | Hurley et al. |
| 6,106,345 A | 8/2000 | Yeh |
| 6,167,790 B1 | 1/2001 | Bambara et al. |
| 6,224,706 B1 | 5/2001 | Matich |
| 6,391,438 B1 | 5/2002 | Ramesh et al. |
| 6,394,864 B2 | 5/2002 | Scharl |
| 6,416,614 B1 | 7/2002 | Ziegler |
| 6,492,013 B1 | 12/2002 | Ramesh |
| 2003/0003293 A1 | 1/2003 | Ramesh |
| 2003/0008575 A1 | 1/2003 | Leonard |

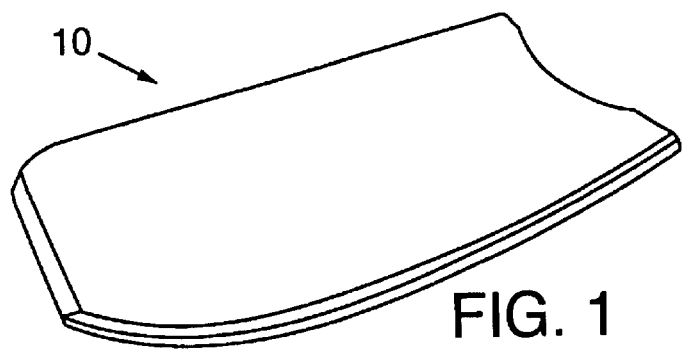
FIG. 1
FIG. 2
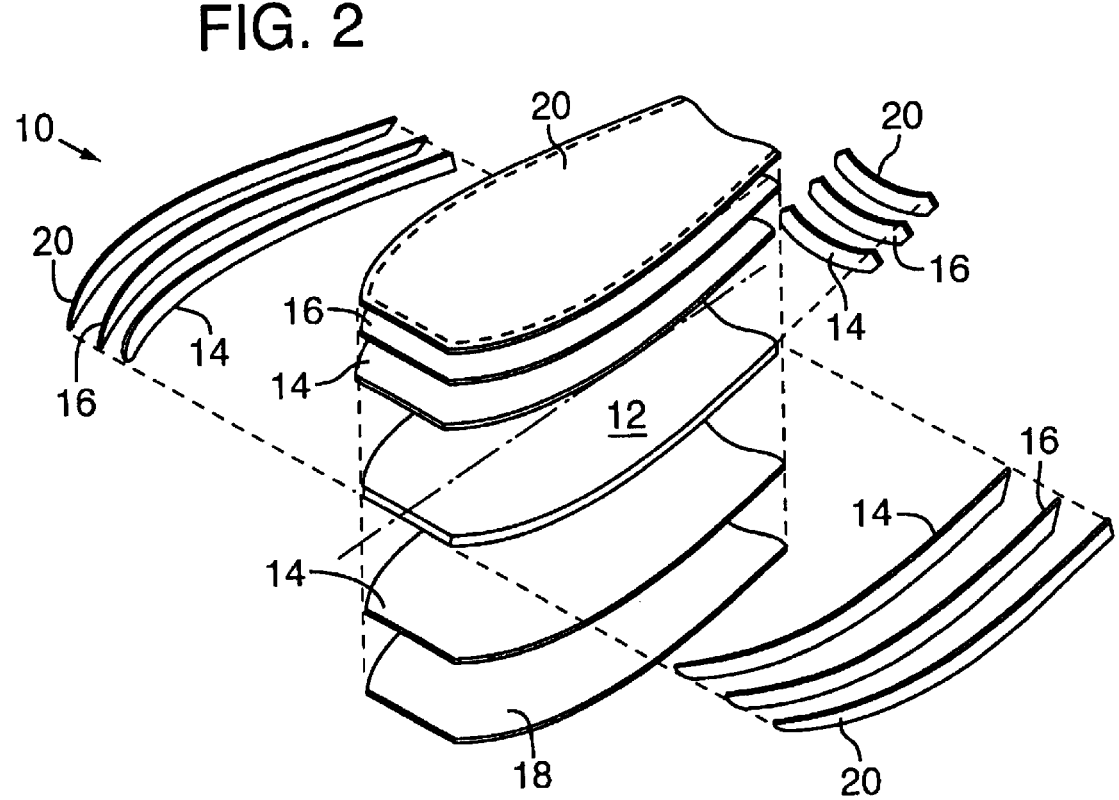

EXPANDED POLYSTYRENE CORE SPORTS BOARD

BACKGROUND

Sports boards are popular and widely known for providing recreational entertainment in both warm and cold weather environments. Sports boards are often composed of a lightweight foam core, plastic film skins on the top and the side rails, and a thick slick plastic bottom surface layer. Typically a polyethylene foam core is used and the skins and slick layers are made of composites of solid polyethylene sheet material and foam polyethylene material. Use of polyethylene for both the core and skins allows for heat laminating, bonding the skins to the core of the board because of the thermoplastic properties of both polyethylene foam and solid polyethylene sheet material.

One drawback to using a polyethylene core is that it does not have the structural stiffness that other foam polymer materials may have at similar densities. For example, expanded polystyrene (EPS) foam has more structural stiffness at a similar density than does polyethylene (PE) foam. A stiffer core for the sports board improves the sports board performance in a variety of applications, such as surfing, sledding, or similar activities.

One problem with using polystyrene cores is that polyethylene or other polyolefin skins are difficult to bond directly to polystyrene. Typically, a solvent-based adhesive will have to be used to bond a polyolefin to polystyrene. Solvent-based adhesives have several drawbacks. Solvent-based adhesives outgas the solvents as they cure. In some cases, if the adhesive cures incompletely, then it does not achieve the desired bonding strength.

It may be desirable to develop a method of heat bonding a polyolefin material to an expanded polystyrene foam material to form a sports board that has the structural stiffness advantages of a expanded polystyrene core and the desirable tactile properties of polyolefin skins bonded to the core.

SUMMARY

A sports board that includes an expanded-polystyrene sports board core. The sports board includes a composite top skin heat bonded to the top surface of the expanded polystyrene sports board core. Composite side rail skins are heat bonded to side rails of the expanded polystyrene sports board core. A composite slick bottom skin is heat bonded to a bottom surface of the expanded polystyrene sports board core.

BRIEF DESCRIPTION OF THE DRAWINGS

FIG. 1 is a perspective view of an embodiment of an expanded polystyrene core sports board.

FIG. 2 is an exploded assembly view of the sports board of FIG. 1.

DETAILED DESCRIPTION

Figure 3:
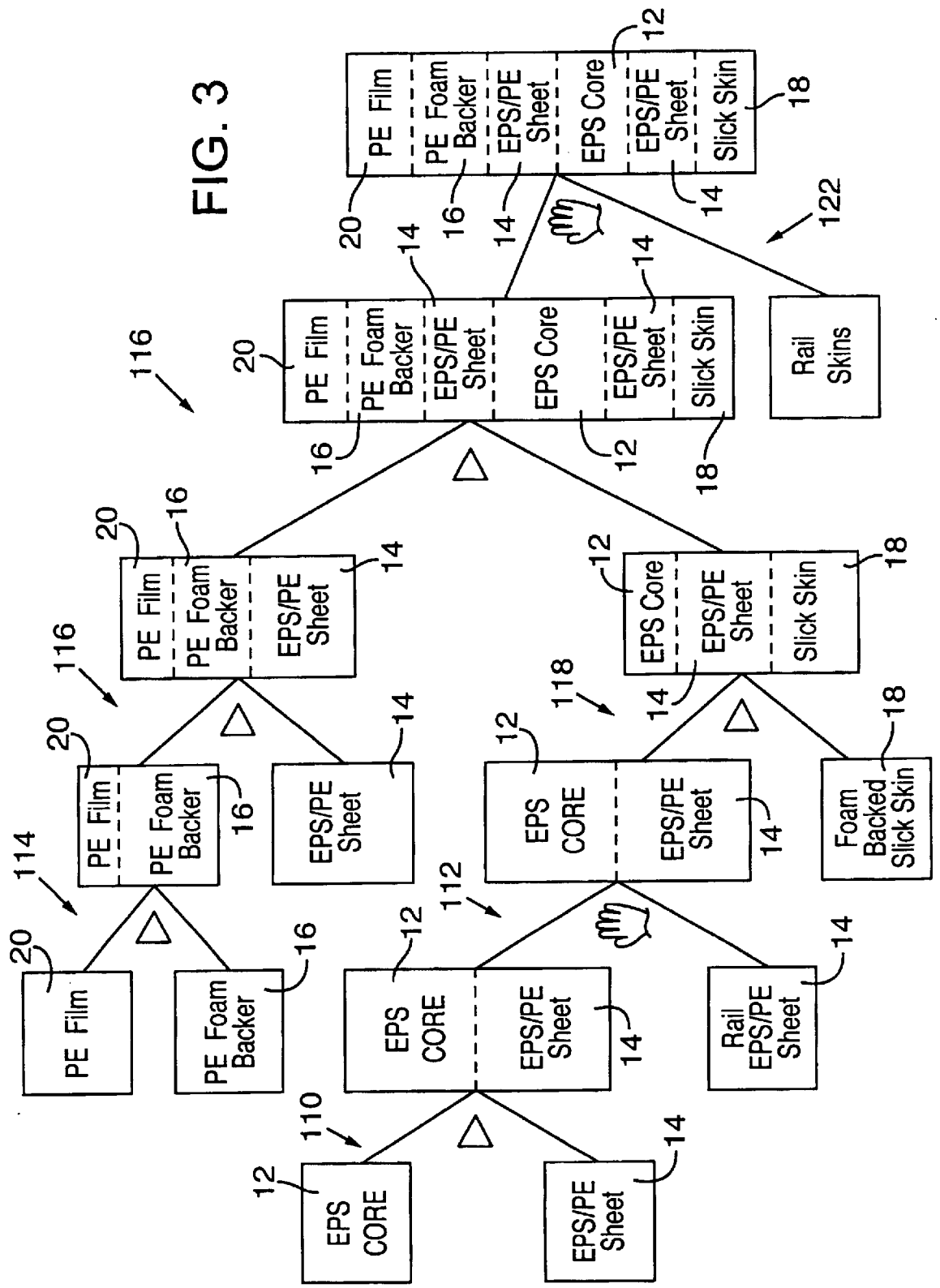
FIG. 3 is a schematic illustrating an exemplary set of steps for making an expanded polystyrene core sports board.

A sports board according to an embodiment of the present invention is generally indicated at 10, in FIG. 1. Sports board 10 is a body board type sports board used for prone surfing in breaking waves adjacent the beach. It will be understood that any type of sports board may be constructed according to the present invention and the body board type shown is illustrative of only one embodiment.

FIG. 2 clearly illustrates construction of the sports board of FIG. 1. The construction of sports board 10 may be easily understood examined from the expanded polystyrene (EPS) core 12 outward. The center of the board is made up of core 12 giving the sports board its shape and structural stiffness. Core 12 may be a pure EPS core or it may be an EPS, PE hybrid core. The thickness will vary depending on the application that the board will be used with; the range being a thickness of between ½" to 5". Snow products are typically ½" to 1½", bodyboard type surf boards are typically 1½" to 2½", traditional surfboards are typically 2" to 5". The density of the foam core is between 0.75 pounds per cubic foot to 3 pounds per cubic foot.

Moving out from EPS core 12, a sacrificial blended sheet 14 of expanded polystyrene and polyethylene (EPS/PE) is directly bonded using a heat lamination process to core 12. Sacrificial blended EPS/PE sheets 14 are bonded to all the surfaces of core 12, as will be described in more detail below. Sacrificial blended EPS/PE sheet 14 facilitates bonding between an EPS foam and a polyethylene material because of the blended nature of the EPS/PE sheet. The blended sheet may have a density of between 0.75 pounds per cubic foot to 3 pounds per cubic foot.

Moving out from sacrificial blended EPS/PE sheet 14 on the top and rail surfaces of board 10, foam backer layers 16 are bonded to the blended EPS/PE sheets 14. Foam backer layers 16 are typically a polyethylene foam, but can be other thermoplastic polymer foams also. For example, backer layers 16 may be non-cross linked PE foam, cross linked PE foam (irradiate or chemically cross link), Polypropylene foam, etc. The densities of foam backer layers may be between 2 pounds per cubic foot and 10 pounds per cubic foot. The backer layers may be between ¹⁄₁₆ and ¼ of an inch thick.

Moving out from sacrificial blended EPS/PE sheet 14 on the bottom surface of board 10, a slick sheet, or slick skin 18 is bonded to the blended EPS/PE sheet 14. Slick skin 18 is typically sufficiently thick to ensure that abrasions from normal use do not puncture the slick skin. Sports board 10 may be more functional if a low friction material is used for slick skin 18. A low friction material enhances the performance of the sports board when it is being ridden. Slick skin 18 may be co-extruded onto a foam backer layer, such as backer layers 16. Slick skin 18 may be any suitable material, for example, sheet PE (LDPE, HDPE, or a hybrid), sheet polypropylene, Surlyn, Kraylon, etc. Slick skin 18 may include a decoration, or no decoration. If a decoration is included, then it may be formed through a printing process, sublimation process, hot stamping process, or co-extrusion process. Slick skin 18 may be between 0.005" and 0.050" thick.

Moving out from foam backer layers 16 on the top and rail surfaces of board 10, solid polyolefin surface sheets 20, are bonded to the foam backer layers. Typically, surface sheets or top skin sheets 20 are polyethylene. The top skin and rails may be of a thickness of between 1/16–1/4 of an inch. These surface sheets may be decorated or non-decorated. Typically, If a cross linked surface sheet 20 is use a non-cross linked foam baker layer 16 will be used to improve adhesion between the layers. The non-cross linked backer foam can be from 0.030" to 0.1875" thick and between 2 pound per cubic foot and 10 pounds per cubic foot density. It will be understood that this bonding could also be accomplished by using a dry adhesive film in place of the non-cross linked foam at a higher cost. Bonding of sheets 20 to foam backer layers 16 will be discussed in more detail below.

As FIG. 2 shows, the construction of sports board 10 includes EPS core 12, sacrificial blended EPS/PE sheets 14, foam backer layers 16, slick skin 18, and surface sheets 20. Sports boards of this construction provide a good combination of structural stiffness, lightweight, and useful surface properties, without the drawback of having to use solvent adhesives for bonding the skin layers to the core.

FIG. 3 shows schematically one embodiment of a method for constructing a sports board, such as that shown in FIGS. 1 and 2. It should be understood that variations on the method illustrated in FIG. 3 may be suitable to construction of the sports board of the present invention. The method may not use harsh chemicals in the manufacturing process. Because the method does not use volatile solvents that are associated with glues, there is no off gassing. In traditional constructions top skin layers or sheets act as a barrier for off gassing resulting in the glues not fully curing once the board is assembled. Using the method described herein a more durable, consistent, and stable adhesion between the materials is created. This results in a better water proof barrier. The added intermediary layer increases stiffness and durability of the sports board that is more environmentally friendly.

The method is generally indicated at 100, in FIG. 3. Initially, as indicated at 110, a blended EPS/PE sheet 14 is bonded to the bottom surface of EPS core 12 using a heat laminating process. One heat laminating process is more clearly illustrated in FIG. 4, and will be discussed further below. It will be understood that any suitable heat bonding laminating process configured to form a direct bond between layers of a sports board may be used. The heat bonding lamination process is selected from the group consisting of hot air lamination, inferred heat lamination, and radiant heat lamination.

After heat laminating blended EPS/PE sheet 14 to core 12, blended EPS/PE sheets 14 are laminated to the rails of EPS core 12, as indicated at 112. Any suitable laminating process may be used. Typically, a hand laminating process is used because of the angles and the size and shape of the rails. Hand laminating may be accomplished using a heat gun and an ironing process.

In a parallel process, as indicated at 114, a surface skin 20 is bonded to a foam backer layer 16 using a heat laminating process. Foam backer layer 16 and surface skin 20 may be polyethylene material. The heat laminating process is illustrated in detail in FIG. 6. The laminating process results in a layered composite of surface skin 20 and foam backer 16.

Figure 6:
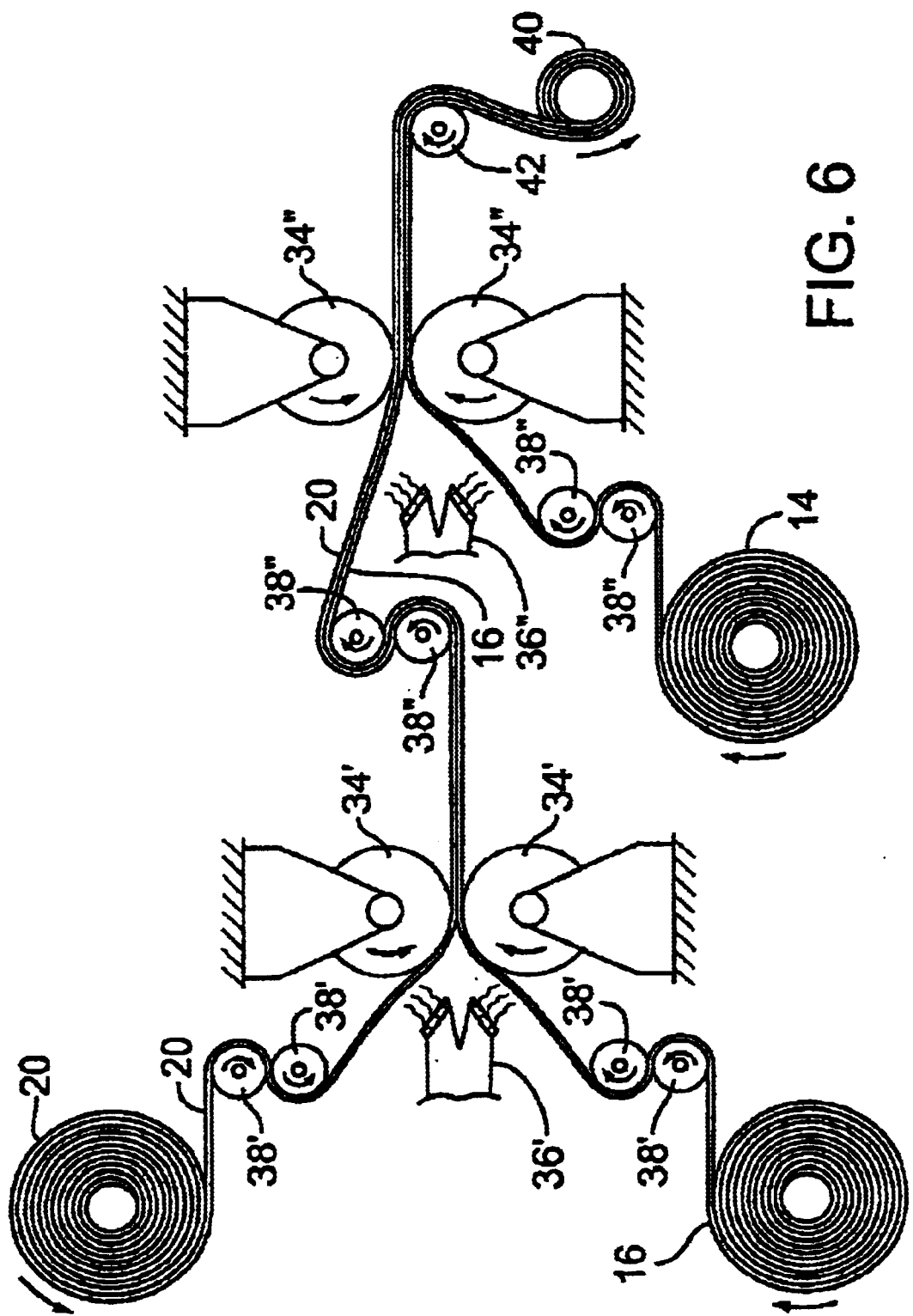
FIG. 6 is a schematic view of a processing step for making an expanded polystyrene core sports board, illustrating the laminating of a polyolefin sheet to a foam backer and then laminating the polyolefin sheet/foam backer to a blended sheet of expanded polystyrene and polyethylene to form a composite top skin.

The resulting layered surface skin 20/foam backer 16 composite is heat laminated to a blended EPS/PE sheet 14 forming a composite top skin (20/16/14), as indicated at 116. The laminating process forming composite top skin (20/16/14) is also illustrated in FIG. 6. Composite top skin (20/16/14) is ready to be laminated to EPS core 12.

At 118, slick skin 18 is bonded to the EPS/PE sheet 14 that was bonded to the bottom side of core 12, as indicated above at 110. Slick skin 18 may be a relatively thick, low-friction polyolefin sheet. Slick skin 18 may be a polyethylene sheet. Providing slick skin 18 on the bottom surface of sports board 10 improves the performance characteristics of the sports board because of the low friction surface and durability of the slick skin.

After 118, EPS core 12 includes a slick skin 18 on the bottom external surface, and a sacrificial blended EPS/PE sheet 14 bonding skin 18 to EPS core 12. Composite top skin (20/16/14) is bonded to the top side of EPS core 12 using a heat laminating process, as indicated at 120. The heat laminating process for bonding the composite top skin to the EPS core is illustrated in more detail in FIG. 7.

Sports board 10, from top to bottom, includes the following layers: a top surface skin 20, a foam backer 16, an EPS/PE blended sheet 14, EPS core 12, another EPS/PE blended sheet 14, and slick skin 18. Top surface skin 20 provides a relatively high friction surface for keeping a rider on sports board 10. The two EPS/PE blended layers act as a solid gluing layer that bonds the skins to the EPS core without out gassing of a solvent or extended curing periods. Slick skin 18 provides a durable and low friction surface for gliding, surfing, and sledding. EPS core 12 provides lightweight and structural stiffness improving the performance characteristics of the sports board.

The last step in manufacturing sports board 10, as indicated at 122, is laminating rail skins onto the EPS/PE layers that were laminated to EPS core 12 at 112. The rail skins may be made of a PE solid sheet and a PE foam backer. The completed sports board resembles the structure shown in FIG. 1. Each of the processing steps illustrated in FIG. 3 above, will be discussed in more detail with reference to FIGS. 4–7.

Figure 4:
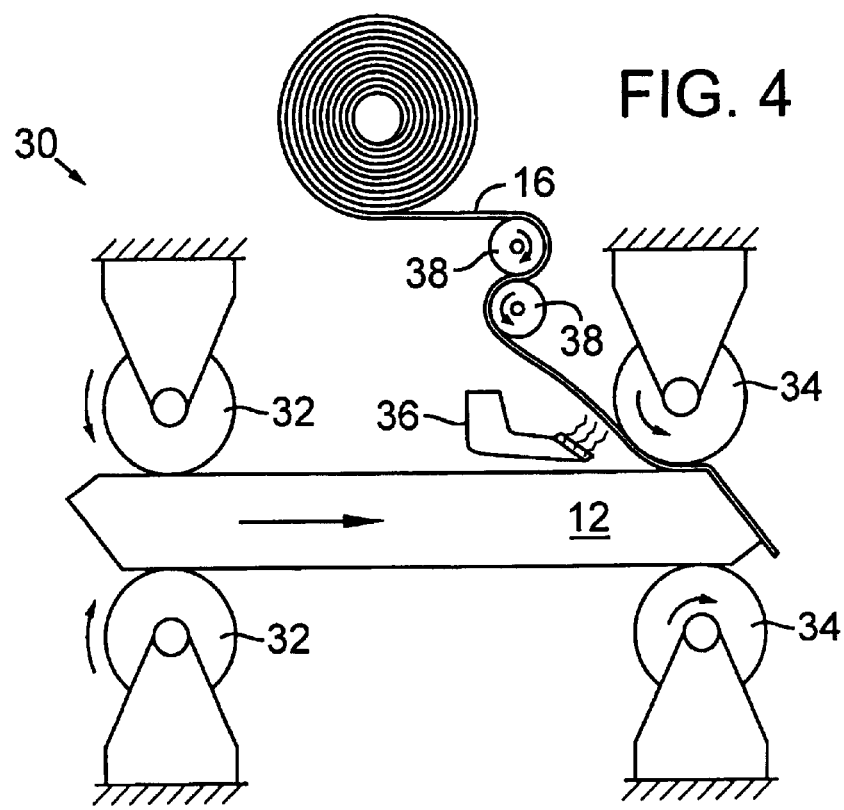
FIG. 4 is a schematic view of a processing step for making an expanded polystyrene core sports board, illustrating laminating a blended sheet of expanded polystyrene and polyethylene to an expanded polystyrene sports board core.

FIG. 4 illustrates schematically the manufacturing equipment and process for heat laminating EPS/PE blended sheet 14 to EPS core 12. A hot air laminator is generally indicated at 30, in FIG. 4. Hot air laminator 30 includes two pairs of opposed rollers, a pair of guide rollers 32 and a pair of laminating rollers 34. A heat nozzle 36 is positioned in front of laminating rollers 34 and configured to provide heat for lamination. A roll of EPS/PE blended sheet 14 is positioned to feed into hot air laminator 30, as indicated in FIG. 4. A pair of tensioning rollers 38 may be used to control the speed of the feed sheet being laminated to EPS core 12.

Laminating rollers 34 may be temperature and pressure controlled to optimize the laminating process. The rollers may be heated or cooled to provide the optimal bonding temperature based on the material properties of the core and feed sheet. Similarly, the pressure between laminating rollers 34 may be changed by applying an upward force on the bottom roller or a downward force on the top roller. Additionally, the speed at which EPS core 12 and blended sheet 14 are process through laminating rollers 34 may be adjusted for optimal bonding between the two materials.

EPS core 12 is feed through the guide rollers and aligned with the feed material prior to inserting through laminating rollers 34. Blended EPS/PE sheet 14 is heated by hot air being exhausted from heat nozzle 36 to soften the blended sheet enough to form a continuous bond between the blended EPS/PE sheet and EPS core 12. Using a properly configured hot air laminator, such as laminator 30, a blended EPS/PE sheet may be directly bonded to an EPS core of a sports board, as described above with reference to FIG. 3 at 110.

Figure 5:
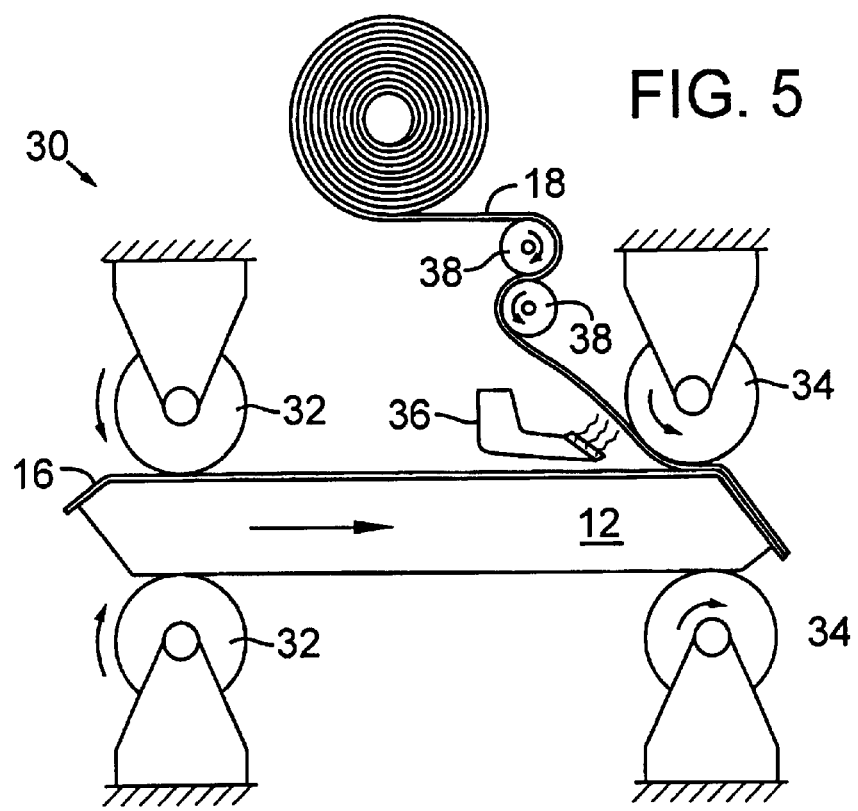
FIG. 5 is a schematic view of a processing step for making an expanded polystyrene core sports board, illustrating laminating a slick skin to a blended sheet of expanded polystyrene and polyethylene.

FIG. 5 illustrates hot air laminator 30 configured to laminate slick skin 18 on top of the blended EPS/PE sheet 14 that was bonded on the bottom of EPS core 12. Slick skin 18 may be any material that may be heat laminated directly to a blended EPS/PE sheet. For example, slick skin 18 is made of a polyolefin, such as polyethylene, polypropylene, etc. Laminator 30 is optimized for temperature, speed, and pressure to ensure a strong continuous bond between slick skin 18 and blended EPS/PE sheet 14. As noted above, blended EPS/PE sheet 14 acts as a sacrificial layer in that its purpose is to make a good bond through heat lamination between EPS core 12 and slick skin 18.

A roll of slick skin 18 is positioned to feed slick skin 18 into laminating rollers 34. EPS core 12 with the EPS/PE blended sheet bonded thereto is feed through the guide rollers bottom side up and aligned with the slick skin feed material prior to inserting through laminating rollers 34. Slick skin 18 is heated by hot air being exhausted from heat nozzle 36 to soften it enough to form a continuous bond between the slick skin and blended EPS/PE sheet.

FIG. 6 illustrates the lamination of surface film 20, or surface skin 20 to foam backer 16 and the subsequent lamination of the combination surface skin 20 and foam backer 16 to blended EPS/PE sheet 14, as described above, with reference to FIG. 3, at 114 and 116 respectively. A roll of surface skin 20 is positioned to feed through a set of tensioning rollers 38' into a pair of laminating rollers 34'. A roll of foam backer 16 is similarly positioned to feed through a set of tensioning rollers 38' into the pair of laminating rollers 34'. A heat nozzle 36' is configured to apply hot air to soften the bonding surfaces of both surface skin 20 and foam backer 16 prior to being sandwiched together between laminating rollers 34'.

Laminating rollers 34', like laminating rollers 34, may be adjusted to vary the pressure, temperature and speed at which materials are processed between the rollers. A cooling period takes place after the lamination to ensure that skin 20 and foam backer 16 are cured and properly bonded together. The distance illustrated in FIG. 6 may not be representative of this cooling period and significantly greater relative distances of travel between sequential lamination steps may be required for optimal bonding of the skin the foam backer.

After surface skin 20 is bonded to foam backer 16, the combined laminate sheet of skin 20 and foam backer 16 are further laminated to a sacrificial blended EPS/PE sheet 14. A roll of blended EPS/PE sheet 14 is positioned to feed through a set of tensioning rollers 38" past heat nozzle 36" into laminating rollers 34". Similarly, a set of tensioning rollers 38" prepare the combined laminate (skin 20/foam backer 16) to travel past heat nozzle 36" and into laminating rollers 34". Laminating rollers 34", like laminating rollers 34 and 34' may be adjusted to vary the pressure, temperature and speed at which materials are processed between the rollers. As noted above varying pressure, temperature, and speed enable optimization to produce the best bonding between the two materials being laminated.

Blended EPS/PE sheet 14 bonds to the combined laminate as it travels through laminate rollers 34" and is stored on a take-up roll 40, so it can be further processed. One or more idler rollers 42 may be used to aid in handling the composite three-layer laminate. The composite three layer laminate that results includes skin 20 bonded on top of foam backer 16, which is bonded on top of sacrificial blended EPS/PE sheet 14.

Figure 7:
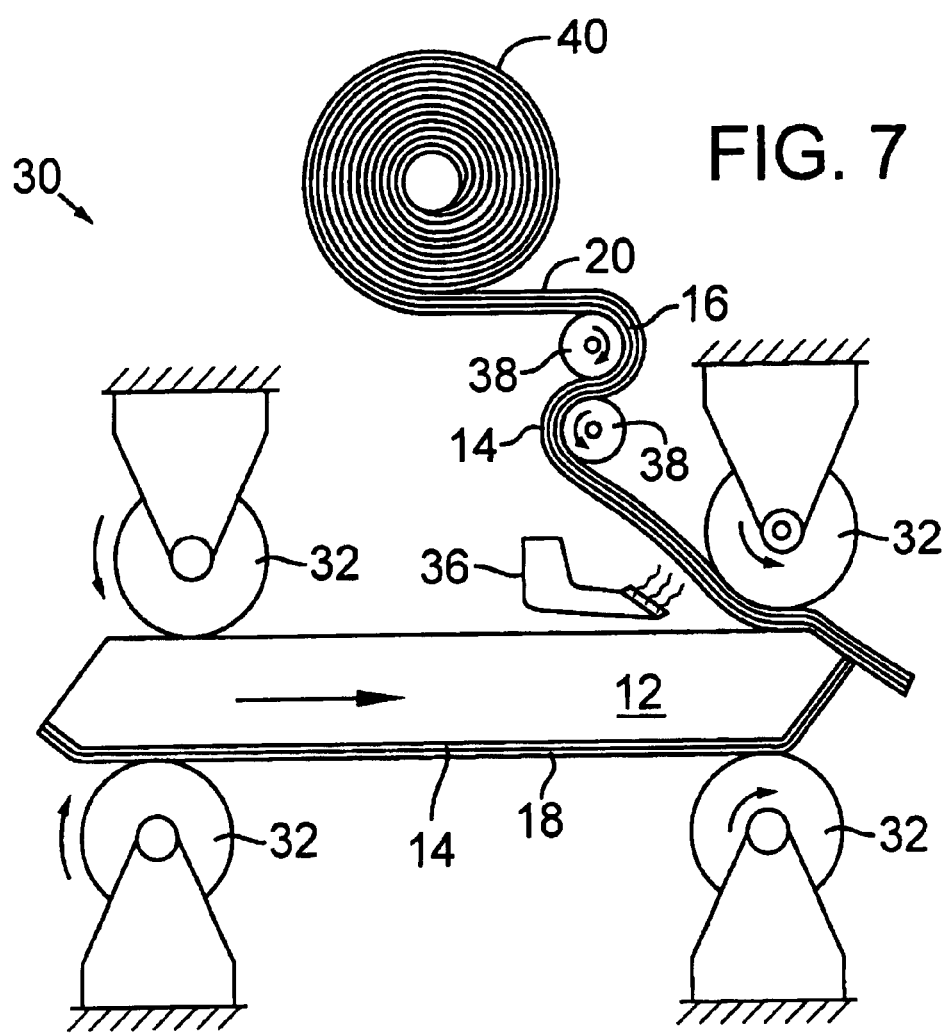
FIG. 7 is a schematic view of a processing step for making an expanded polystyrene core sports board, illustrating the laminating of a composite top skin to the top surface of an expanded polystyrene sports board core.

FIG. 7 illustrates the final automated manufacturing step for production of sports board 10. Take-up roll 40, containing the composite three layer laminate described above, is positioned for feeding into laminating rollers 34 of hot air laminator 30. EPS core 12 is reversed so that the top side thereof is positioned to receive the composite three-layer laminate and the EPS core is feed through guide rollers 32. EPS core passes below heat nozzle 36 and aligns with the composite laminate. Sacrificial blended EPS/PE sheet 14 passes adjacent heat nozzle 36 and is softened for bonding with EPS core 12. The composite laminate and EPS core pass under pressure through laminating rollers 34 and are bonded together.

Subsequent to laminating the composite laminate to EPS core 12, rail skins constructed of a surface skin layer and a foam backer are laminated to the rails of EPS core 12, which have previously been covered via lamination with a sacrificial blended EPS/PE sheet to enable the lamination of the film/foam backer rail skins thereon. Often this step is done with a hand lamination process to ensure that the complex surface of the rails bonds completely with the rail skins.

The above method illustrates how a sports board constructed with the structure illustrated in FIG. 2 may be manufactured. Those skilled in the art will comprehend that variations and alternate types of laminating techniques may be successfully employed to achieve the same sports board construction, and the example discussed above is merely illustrative and should not be interpreted as the only suitable method for manufacturing a sports board with the structure illustrated in FIG. 2.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A method of making an expanded polystyrene core sports board comprising:

laminating a first blended sheet of expanded polystyrene and polyethylene to a bottom surface of an expanded polystyrene sports board core;

laminating a slick skin to the first blended sheet of expanded polystyrene and polyethylene on the bottom of the expanded polystyrene sports board core;

laminating a surface sheet to a foam backer sheet to form a foam-backed sheet;

laminating the foam backer side of the foam-backed sheet to a second blended sheet of expanded polystyrene and polyethylene to form a composite top skin;

laminating the composite top skin to the top surface of the expanded polystyrene sports board core; and laminating a set of rail skins having the same composite structure as the top skin to the rails of the expanded polystyrene sports board core.

2. The method of claim 1, wherein laminating a first blended sheet of expanded polystyrene and polyethylene to a bottom surface of an expanded polystyrene sports board core includes laminating with a heat bonding lamination process.

3. The method of claim 2, wherein the heat bonding lamination process is selected from the group consisting of hot air lamination, inferred heat lamination, and radiant heat lamination.

4. The method of claim 1, wherein laminating a surface sheet to a foam backer sheet to form a foam-backed sheet includes laminating with a heat bonding lamination process.

5. The method of claim 4, wherein the heat bonding lamination process is selected from the group consisting of hot air lamination, inferred heat lamination, and radiant heat lamination.

6. The method of claim 1, wherein laminating the foam backer side of the foam-backed sheet to a second blended sheet of expanded polystyrene and polyethylene to form a composite top skin includes laminating with a heat bonding lamination process.

7. The method of claim 6, wherein the heat bonding lamination process is selected from the group consisting of hot air lamination, inferred heat lamination, and radiant heat lamination.

8. The method of claim 1, wherein laminating the composite top skin to the top surface of the expanded polystyrene sports board core includes laminating with a heat bonding lamination process.

9. The method of claim 8, wherein the heat bonding lamination process is selected from the group consisting of hot air lamination, inferred heat lamination, and radiant heat lamination.

10. The method of claim 1, wherein laminating a surface sheet to a foam baker sheet includes using heat bonding lamination process to bond the surface sheet to the foam backer sheet.

11. The method of claim 10, wherein the heat bonding lamination process is selected from the group consisting of hot air lamination, inferred heat lamination, and radiant heat lamination.

12. The method of claim 1, wherein laminating a set of rail skins having the same composite structure as the top skin to the rails of the expanded polystyrene sports board core includes laminating a blended expanded polystyrene and polyethylene sheet to the rails of the expanded polystyrene sports board core prior to laminating a foam backer sheet and a surface sheet.

13. A sports board comprising:
   an expanded polystyrene sports board core;
   a composite top skin heat bonded to the top surface of the expanded polystyrene sports board core, the top skin including, a solid top sheet of a polyolefin material, a polyethylene foam backer sheet heat bonded to the solid top sheet, and a blended sheet of expanded polystyrene and polyethylene heat bonded to the foam backer sheet;
   composite side rail skins heat bonded to side rails of the expanded polystyrene sports board core; and
   a composite slick bottom skin heat bonded to a bottom surface of the expanded polystyrene sports board core.

14. The sports board of claim 13, wherein the composite side rail skins include:
   a solid top sheet of a polyolefin material;
   a polyethylene foam backer sheet heat bonded to the solid top sheet; and
   a blended sheet of expanded polystyrene and polyethylene heat bonded to the foam backer sheet.

15. The sports board of claim 14, wherein the composite slick bottom skin includes a solid surface layer heat bonded to a blended sheet of expanded polystyrene and polyethylene.

16. The sports board of claim 15, wherein the solid surface layer includes a solid low friction polyolefin material.

* * * * *

(12) EX PARTE REEXAMINATION CERTIFICATE (6095th)
United States Patent
Burke

(10) Number: US 6,908,351 C1
(45) Certificate Issued: Jan. 8, 2008

(54) EXPANDED POLYSTYRENE CORE SPORTS BOARD

(75) Inventor: Scott Burke, Oceanside, CA (US)

(73) Assignee: Union Bank of California, N.A., Walnut Creek, CA (US)

Reexamination Request:
No. 90/008,031, May 19, 2006

Reexamination Certificate for:
Patent No.: 6,908,351
Issued: Jun. 21, 2005
Appl. No.: 10/603,225
Filed: Jun. 24, 2003

(51) Int. Cl.
*B63B 35/73* (2006.01)
*B63B 35/79* (2006.01)

(52) U.S. Cl. .......... 441/65; 114/39.14; 441/74
(58) Field of Classification Search .......... None
See application file for complete search history.

(56) References Cited

U.S. PATENT DOCUMENTS

| | | | | |
|---|---|---|---|---|
| 4,850,913 A | * | 7/1989 | Szabad, Jr. ............ | 441/65 |
| 5,275,860 A | * | 1/1994 | D'Luzansky et al. ...... | 428/71 |
| 5,679,432 A | * | 10/1997 | Holmquest et al. ...... | 428/71 |
| 5,944,570 A | * | 8/1999 | Appleby ............... | 441/65 |
| 6,492,013 B1 | * | 12/2002 | Ramesh ............... | 428/308.4 |

\* cited by examiner

*Primary Examiner*—David O. Reip

(57) ABSTRACT

A sports board that includes an expanded-polystyrene sports board core. A composite top skin is heat bonded to the top surface of the expanded polystyrene sports board core. Composite side rail skins are heat bonded to side rails of the expanded polystyrene sports board core. A composite slick bottom skin is heat bonded to a bottom surface of the expanded polystyrene sports board core.

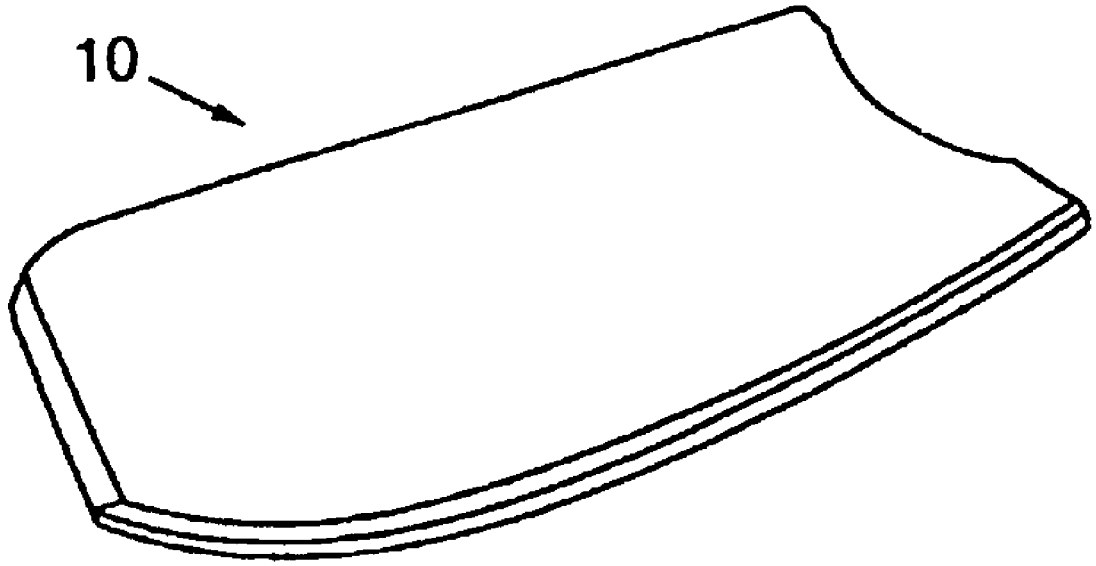

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *